Dec. 24, 1968  R. A. BUCHROEDER ET AL  3,418,038
FOUR-COMPONENT SYMMETRICAL PROJECTION OBJECTIVE
Filed April 20, 1966
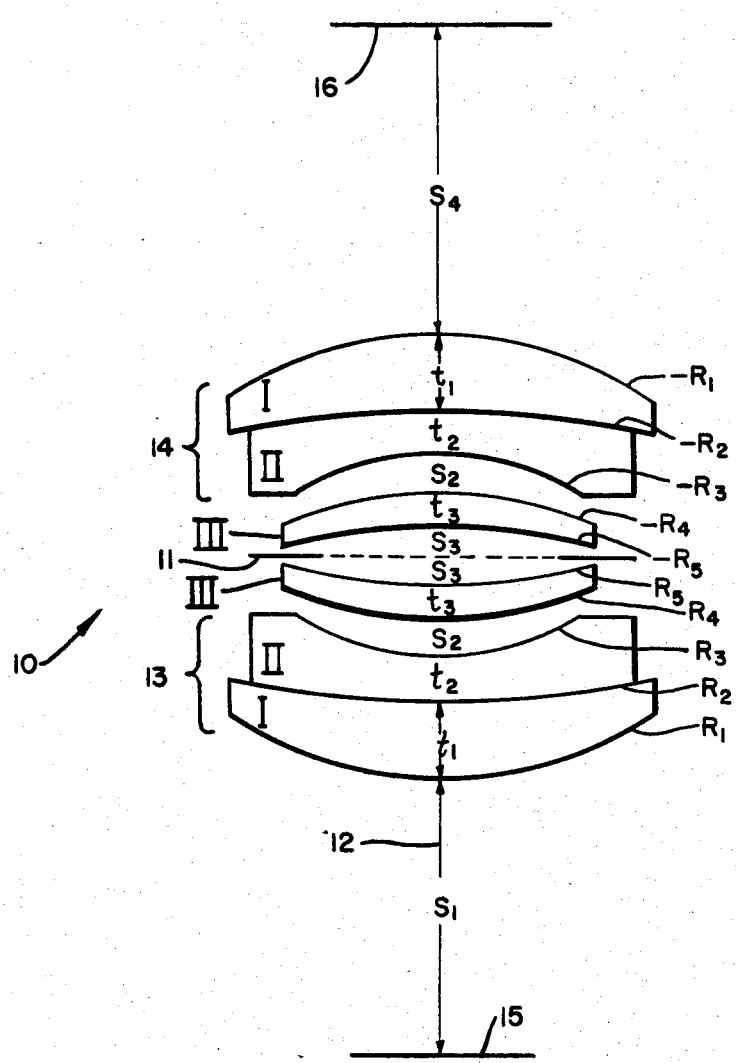
RICHARD A. BUCHROEDER
GEORGE F. ZIEGLER
INVENTORS
BY Frank C. Parker
ATTORNEY

United States Patent Office 3,418,038
Patented Dec. 24, 1968

3,418,038
FOUR-COMPONENT SYMMETRICAL
PROJECTION OBJECTIVE
Richard A. Buchroeder, Brighton, and George F. Ziegler, Gates, N.Y., assignors to Bausch & Lomb Incorporated, Rochester, N.Y., a corporation of New York
Filed Apr. 20, 1966, Ser. No. 544,008
2 Claims. (Cl. 350—209)

The present invention relates to optical objectives and more particularly it relates to improvements in projection objectives of the symmetrical type.

Objectives of this kind are represented in the prior art by the patent to Rudolph, German Patent No. 310,615, issued Mar. 15, 1918, and are intended to be used for copy work at unity magnification.

An object of the present invention is to provide a novel copying objective of symmetrical form having a relative aperture at least as large as f/5.6 at infinity, a total conjugate length of substantially 23.5 inches, said objective being corrected for all ordinary chromatic and monochromatic image aberrations including curvature of field and distortion.

Further objects and advantages will be apparent in the details described in the following specification taken together with the accompanying drawing wherein the single figure is an optical diagram showing a preferred form of the present invention.

The objective is generally designated by the numeral 10, and consists of a front and a rear group of lenses constituting the aforesaid objective, the two duplicate groups confronting each other on either side of an interposed air spaced diaphragm 11 and being mutually aligned on a common axis 12. Each said group consists of a doublet lens member of meniscus form which is duplicated in the other group and is concave toward the diaphragm 11. Said doublet front and rear lens members are numbered 13 and 14 respectively and are each composed of an outer convex-concavo lens element designated I which is cemented along an interface to an inner convex-concavo lens element designated II.

Between the doublets 13 and 14 are spaced a pair of duplicate singlet meniscus lens members which are both designated III, these singlets being arranged concave toward said interposed diaphragm 11 as shown in the drawing.

Both groups of lens members I to III are symmetrically arranged between an object plane 15 and an image plane 16 whereat the objective forms an image at unity magnification, the front and rear air spaces being designated $S_1$ and $S_4$ respectively and being substantially equal in value. The air space between doublet lens member 13 and singlet lens member III is designated $S_2$, and the corresponding air space between doublet 14 and the adjacent singlet III is designated $S_2$ like the front group of lenses. Duplicate air spaces $S_3$ are provided at either side of diaphragm 11 between the singlet lenses III.

The successive lens elements I to III on each side of the diaphragm 11 have their axial thicknesses designated $t_1$ to $t_3$ respectively numbering toward the diaphragm and the successive lens surfaces of said elements are designated $R_1$ to $R_5$ for the front group and $-R_1$ to $-R_5$ for the rear group, the minus (—) sign used with certain R designations meaning that such surfaces are concave toward the object surface 15. Therefore, all of the lens surfaces are concave toward the diaphragm.

According to the present invention, the lens parameters, such as focal lengths, lens surface radii, lens thicknesses and refractive index of the glass from which each lens element is made, are so chosen by computation and experiment that all of the aforesaid objects and advantages are achieved. In the table herebelow are given substantially the values of the above-mentioned lens parameters in terms of F which is the equivalent focal length of the objective 10 although it should be understood that slight variations of such values within manufacturing tolerances are allowable. The successive focal lengths in the table are designated $F_I$, $-F_{II}$, $F_{III}$ for each lens group relating to lens elements I, II and III respectively thereof. Furthermore, the following table gives the values substantially in terms of F for the lens thicknesses $t_1$ to $t_3$, lens radii $R_1$ to $R_5$, and air spaces $S_1$ to $S_4$. Additionally, the values for refractive index $n_D(I)$ to $n_D(III)$ and for Abbe numbers $\nu(I)$ to $\nu(III)$ related to the optical materials of the lens elements I to III are given in said table.

Table of values $F_I = .404F$
$-F_{II} = .333F$
$F_{III} = 1.194F$
$R_1 = -R_1 = .242F$
$R_2 = -R_2 = 2.105F$
$R_3 = -R_3 = .183F$
$R_4 = -R_4 = .266F$
$R_5 = -R_5 = .395F$
$t_1 = .0526F$
$t_2 = .0276F$
$t_3 = .0215F$
$S_1 = S_4 = 1.870F$
$S_2 = .0214F$
$S_3 = .0178F$
$n_D(I) = 1.670$
$n_D(II) = 1.605$
$n_D(III) = 1.638$
$\nu(I) = 47.2$
$\nu(II) = 38.0$
$\nu(II) = 55.5$ wherein F represents the equivalent focal length of the objective 10.

More specifically, the constructional data related to the objective 10 is given numerically in the tabulation herebelow wherein all scalar quantities are given in millimeters and wherein the symbolism remains the same as hereabove E.F.L.=148.58   B.F.L.=129.58   f/5.6

| Lens | Focal Length | Radii | Thicknesses | Spaces | $n_D$ | $\nu$ |
|---|---|---|---|---|---|---|
| I and II (Doublet) | $-F_{III}=1214.03$ | | | $S_1=278.16$ | | |
| I | $F_I=59.99$ | $R_1$ and $-R_1=35.98$ | $t_1=7.81$ | | 1.670 | 47.2 |
| II | $-F_{II}=49.50$ | $R_2$ and $-R_2=313.33$ | $t_2=4.11$ | | 1.605 | 38.0 |
|  |  | $R_3$ and $-R_3=27.20$ | | $S_2=3.19$ | | |
| III | $F_{III}=177.78$ | $R_4$ and $-R_4=39.50$ | $t_3=3.14$ | | 1.638 | 55.5 |
|  |  | $R_5$ and $-R_5=58.73$ | | $S_3=2.65$ $S_4=278.16$ | | |

Although only one form of the present invention has been shown and described in detail, the values of the parameters given are nominal or ideal in character and small variations from the nominal values may be tolerated without significantly detracting from the performance quality thereof within good manufacturing practice.

We claim:

1. A symmetrical projection objective for use at equal conjugates having an aperture of substantially $f/5.6$, said objective comprising a pair of negative meniscus doublet lens members which are duplicates of each other and are concave toward each other, said members being equally spaced from opposite sides of an interposed diaphragm and being optically aligned on a common axis, each of said members being composed of an outer convex-concavo lens element of positive power designated I which lies in contact with an inner convex-concavo negative lens element designated II, said objective being further composed of a pair of singlet positive meniscus lens members designated III spaced between said doublet members and spaced symmetrically from either side of said diaphragm and being concave thereto, said members and elements having lens parameter values as specified in the table herebelow wherein $F_I$, $-F_{II}$ and $F_{III}$ designate the focal lengths of the lenses I, II and III respectively and the minus (—) sign means negative focal length, $R_1$ to $R_5$ and $-R_1$ to $-R_5$ represent the radii of the successive lens surfaces and the minus (—) sign used therewith means that such radii are concave toward the obect side, $t_1$ to $t_3$ represent the successive axial thicknesses of said lenses numbering toward the diaphragm, $S_1$ and $S_4$ represent the front and back air spaces, $S_2$ represents the space between the doublet lens and the singlet lens, $S_3$ represents the air spaces at either side of the diaphragm, and $n_D$ and $\nu$ represent the refractive index and Abbe number respectively of the glasses from which the lenses are made, Table of values
$F_I = .404F$
$-F_{II} = .333F$
$F_{III} = 1.194F$
$R_1 = -R_1 = .242F$
$R_2 = -R_2 = 2.105F$
$R_3 = -R_3 = .183F$
$R_4 = -R_4 = .266F$
$R_5 = -R_5 = .395F$ Table of values—Continued
$t_1 = .0526F$
$t_2 = .0276F$
$t_3 = .0215F$
$S_1 = S_4 = 1.870F$
$S_2 = .0214F$
$S_3 = .0178F$
$n_D(I) = 1.670$
$n_D(II) = 1.605$
$n_D(III) = 1.638$
$\nu(I) = 47.2$
$\nu(II) = 38.0$
$\nu(III) = 55.5$ wherein F represents the equivalent focal length of the objective.

2. A symmetrical projection objective for use at equal conjugates having an aperture of substantially $f/5.6$, said objective comprising a pair of negative meniscus doublet lens members which are duplicates of each other and are concave toward each other, said members being equally spaced from opposite sides of an interposed diaphragm and being optically aligned on a common axis, each of said members being composed of an outer convex-concavo lens element of positive power designated I which lies in contact with an inner convex-concavo negative lens element designated II, said objective being further composed of a pair of singlet positive meniscus lens members designated III spaced between said doublet members and spaced symmetrically from either side of said diaphragm and being concave thereto, said members and elements having lens parameter numerical values as specified in the table herebelow wherein $F_I$, $-F_{II}$ and $F_{III}$ designate the focal lengths of the lenses I, II and III respectively and the minus (—) sign means negative focal length, $R_1$ to $R_5$ and $-R_1$ to $-R_5$ represent the radii of the successive lens surfaces and the minus (—) sign used therewith means that such radii are concave toward the object side, $t_1$ to $t_3$ represent the successive axial thicknesses of said lenses numbering toward the diaphragm, $S_1$ and $S_4$ represent the front and back air spaces, $S_2$ represents the space between the doublet lens and the singlet lens, $S_3$ represents the air spaces at either side of the diaphragm, and $n_D$ and $\nu$ represent the refractive index and Abbe number respectively of the glasses from which the lenses are made, E.F.L.=148.58   B.F.L.=129.58   $f/5.6$

| Lens | Focal Length | Radii | Thicknesses | Spaces | $n_D$ | $\nu$ |
|---|---|---|---|---|---|---|
| I and II (Doublet) | $-F_{III}=1214.03$ | | | $S_1=278.16$ | | |
| I | $F_I=59.99$ | $R_1$ and $-R_1=35.98$ | $t_1=7.81$ | | 1.670 | 47.2 |
| | | $R_2$ and $-R_2=313.33$ | | | | |
| II | $-F_{II}=49.50$ | $R_3$ and $-R_3=27.20$ | $t_2=4.11$ | | 1.605 | 38.0 |
| | | | | $S_2=3.19$ | | |
| III | $F_{III}=177.78$ | $R_4$ and $-R_4=39.50$ | $t_3=3.14$ | | 1.638 | 55.5 |
| | | $R_5$ and $-R_5=58.73$ | | $S_3=2.65$ | | |
| | | | | $S_4=278.16$ | | |

References Cited

UNITED STATES PATENTS 2,601,595   6/1952   Cook.
3,221,601   12/1965   Betensky et al.

DAVID SCHONBERG, *Primary Examiner.*

R. J. STERN, *Assistant Examiner.*

U.S. Cl. X.R.

350—220

UNITED STATES PATENT OFFICE
CERTIFICATE OF CORRECTION

Patent No. 3,418,038                                December 24, 1968

Richard A. Buchroeder et al.

It is certified that error appears in the above identified patent and that said Letters Patent are hereby corrected as shown below:

Columns 1 and 2, in the table, second column, line 1, and columns 3 and 4, in the table, second column, line 1 thereof, "$-F_{III} = 1214.03$", each occurrence, should read -- $-F_{I,II} = 1214.03$ --. Column 2, line 50, "$\nu(II) = 55.5$" should read -- $\nu(III) = 55.5$ --.

Signed and sealed this 17th day of March 1970.

(SEAL)
Attest:

Edward M. Fletcher, Jr.                        WILLIAM E. SCHUYLER, JR.

Attesting Officer                                    Commissioner of Patents